(No Model.)
J. K. PUMPELLY.
SECONDARY BATTERY.
No. 416,299. Patented Dec. 3, 1889.
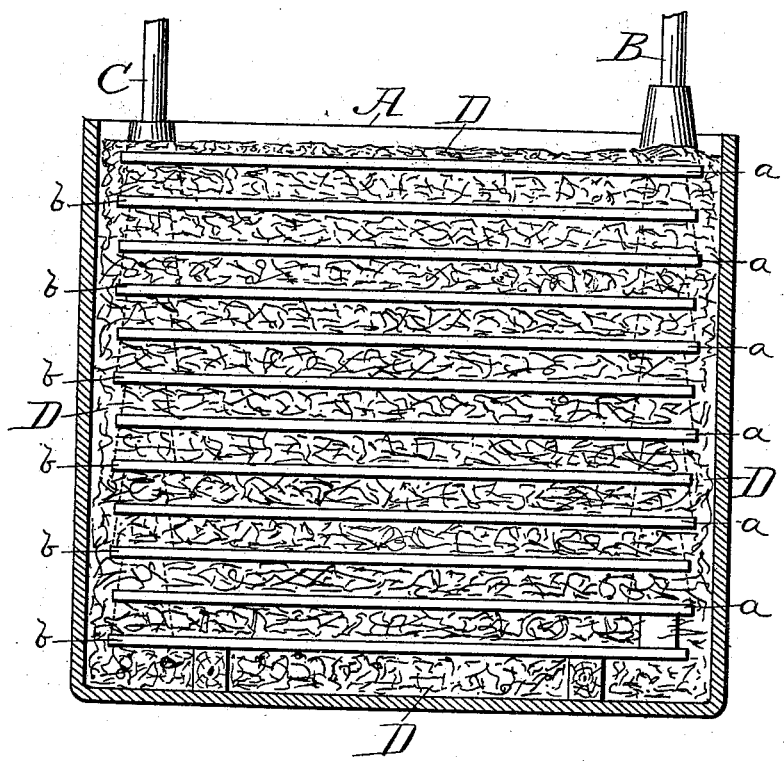
Witnesses
F. H. Goin
James K. Pumpelly
Inventor
By his Attorney
Frank D. Thomason

UNITED STATES PATENT OFFICE.

JAMES K. PUMPELLY, OF CHICAGO, ILLINOIS, ASSIGNOR TO FRANK D. THOMASON, OF SAME PLACE.

SECONDARY BATTERY.

SPECIFICATION forming part of Letters Patent No. 416,299, dated December 3, 1889.

Application filed July 27, 1889. Serial No. 318,964. (No model.)

*To all whom it may concern:*

Be it known that I, JAMES K. PUMPELLY, of Chicago, Cook county, Illinois, have invented a certain new and useful Improvement in Electric Batteries, of which the following is a full, clear, and exact description, reference being had to the accompanying drawings, and to the letters of reference marked thereon.

Electric storage-batteries have heretofore used a liquid electrolyte, and one of the greatest objections urged against their use for illuminating or motor purposes on steam or street cars or on boats, where there is so much jolting and unsteady motion, is that the electrolytic solution splashes so as to materially decrease the efficiency of the battery and injure the surrounding structure adjacent to the cells.

The object of my invention is to avoid the possibility of splashing, to promote free electrolytic action, to prevent the accumulation of gases on the metal conductor-plates, and to increase the per cent. of converted electro-motive force. I accomplish this by making a comparatively dry battery—that is, a battery which dispenses with the electrolytic solution in a free liquid mass, substantially as herein fully described, and as illustrated in the drawing, which shows a figure of one of my improved batteries, taken in vertical longitudinal section.

Referring to the drawing, A represents a suitable cell of any desired shape or dimensions. B represents the positive electrode consisting of a suitable number of metal conductor-plates $a\ a\ a\ a$; and C represents the negative electrode consisting of a complementary set of metal conductor-plates $b\ b\ b\ b$, which alternate with the plates of the positive electrode, as shown. The plates $a$ and $b$ form a support for the active material, which constitutes an essential element of every electric storage or secondary battery.

After the batteries have been constructed and the relative positions of the electrodes obtained in the cells I fill said cell with what is known as "cellulose," made from fiber, D, and pack the same under the plates and between the plates, so as to prevent the said plates from short-circuiting. When the cells are suitably filled with cellulose made from fiber D, I saturate the same with the electrolytic solution, whereupon the battery is ready for charging and discharging in the usual manner.

The reason I use cellulose made from fiber, as above explained, is because, owing to its treatment with caustic lime and its subsequent thorough washing in water, it is perfectly inert and unchangeable under the action of the electrolyte. It is, moreover, very light and porous, and, while promoting free electrolytic action, facilitates the escape of the gases generated, which do not accumulate upon the plates and thus decrease the surface exposed to the electrolyte.

It is not essential so far as my invention is concerned what the peculiar arrangement of the electrodes may be nor what the construction of the conductor-plates is to enable them to support the active material. Any construction of a battery which substitutes saturated cellulose made from fiber either in the loose or compact form for an electrolytic liquid mass comes within the spirit of my invention whether the same is a primary or a secondary battery.

What I claim is—

1. The combination, with an electric battery, of an electrolyte consisting of cellulose made from fiber saturated with electrolytic fluid, as set forth.

2. The combination, with an electric battery and a positive and negative electrode, of an electrolyte consisting of cellulose made from fiber packed around said electrodes and saturated with electrolytic fluid, as set forth.

3. The combination, with an electric battery, a positive and a negative electrode, each having facilities for supporting the active material, and said active material, of an electrolyte consisting of a cellulose made from fiber packed around said electrodes and saturated with electrolytic fluid.

JAMES K. PUMPELLY.

Witnesses:
FRANK D. THOMASON,
FRANK H. GOIN.